W. A. LINQUIST.
AUTOMOBILE FENDER.
APPLICATION FILED APR. 7, 1915.

1,208,993.

Patented Dec. 19, 1916.
4 SHEETS—SHEET 1.

WITNESSES
E. C. Skinkle
A. H. Opsahl

INVENTOR
WILLIAM A. LINQUIST
By Williamson Merchant
ATTORNEYS

W. A. LINQUIST.
AUTOMOBILE FENDER.
APPLICATION FILED APR. 7, 1915.

1,208,993.

Patented Dec. 19, 1916.
4 SHEETS—SHEET 2.

WITNESSES
E. C. Skinkle
A. H. Opsahl

INVENTOR
WILLIAM A. LINQUIST

BY Williamson Merchant
ATTORNEYS

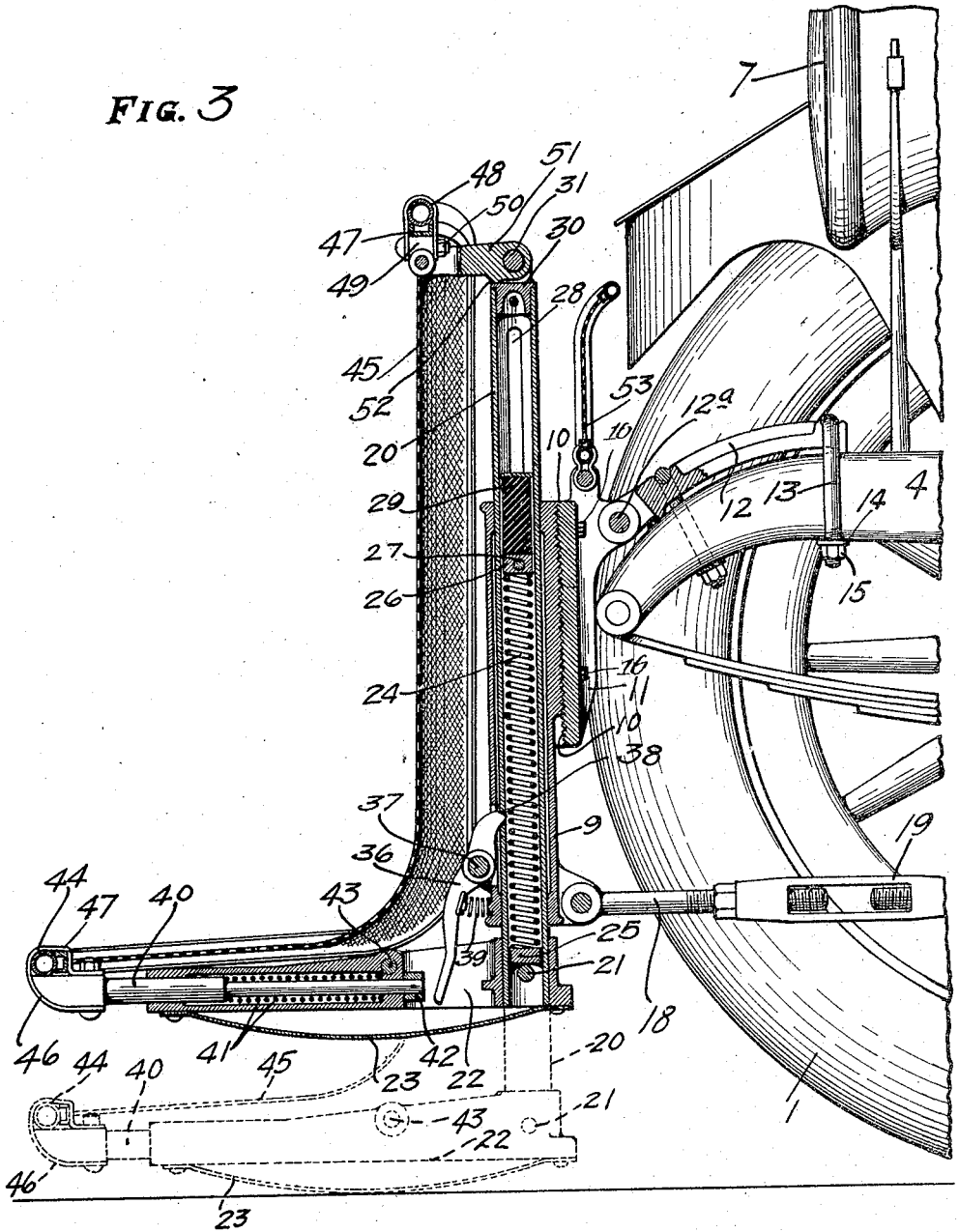

W. A. LINQUIST.
AUTOMOBILE FENDER.
APPLICATION FILED APR. 7, 1915.
1,208,993.
Patented Dec. 19, 1916.
4 SHEETS—SHEET 4.
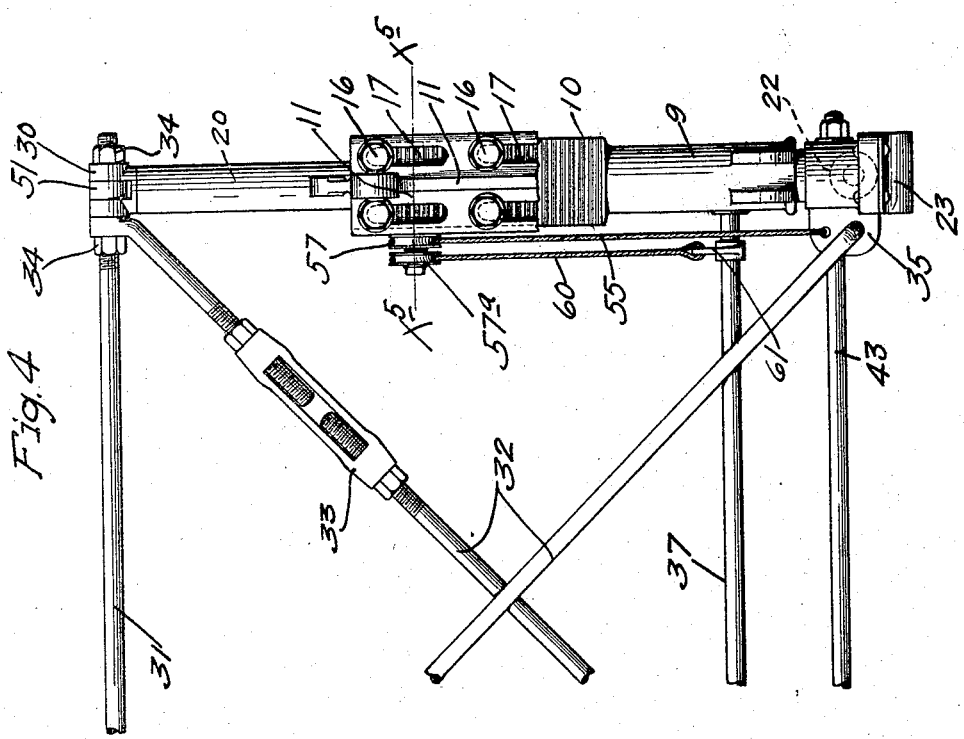
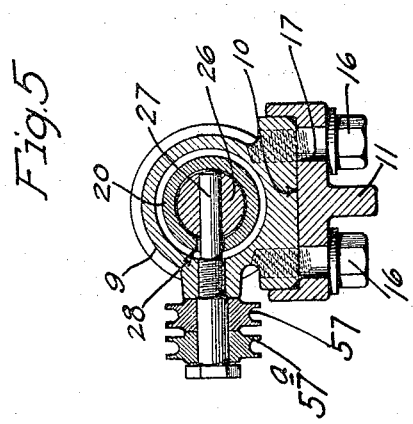
WITNESSES
E. C. Skinkle
A. H. Opsahl
INVENTOR
WILLIAM A. LINQUIST
By Williamson Merchant
ATTORNEYS

UNITED STATES PATENT OFFICE.

WILLIAM A. LINQUIST, OF MINNEAPOLIS, MINNESOTA, ASSIGNOR TO BERTRICE E. LINQUIST, OF MINNEAPOLIS, MINNESOTA.

AUTOMOBILE-FENDER.

1,208,993.   Specification of Letters Patent.   Patented Dec. 19, 1916.

Application filed April 7, 1915.   Serial No. 19,653.

*To all whom it may concern:*

Be it known that I, WILLIAM A. LINQUIST, a citizen of the United States, residing at Minneapolis, in the county of Hennepin and State of Minnesota, have invented certain new and useful Improvements in Automobile-Fenders; and I do hereby declare the following to be a full, clear, and exact description of the invention, such as will enable others skilled in the art to which it appertains to make and use the same.

My present invention has for its object to provide an improved automobile fender and is in the nature of an improvement on, or modification of the construction disclosed and broadly claimed in my prior Patent 1,105,671, of date, August 4th, 1914, entitled automobile fender.

Generally stated, the present invention consists of the novel devices and combinations of devices hereinafter described and defined in the claims.

The present invention is directed particularly to improved means for adjustably connecting the fender to an automobile frame, the improved form of connection between the fender frame and the vertically movable fender supporting plungers or elements, and to certain other features whereby the fender is made generally more efficient.

In the accompanying drawings which illustrate the invention, like characters indicate like parts throughout the several views.

Figure 1:
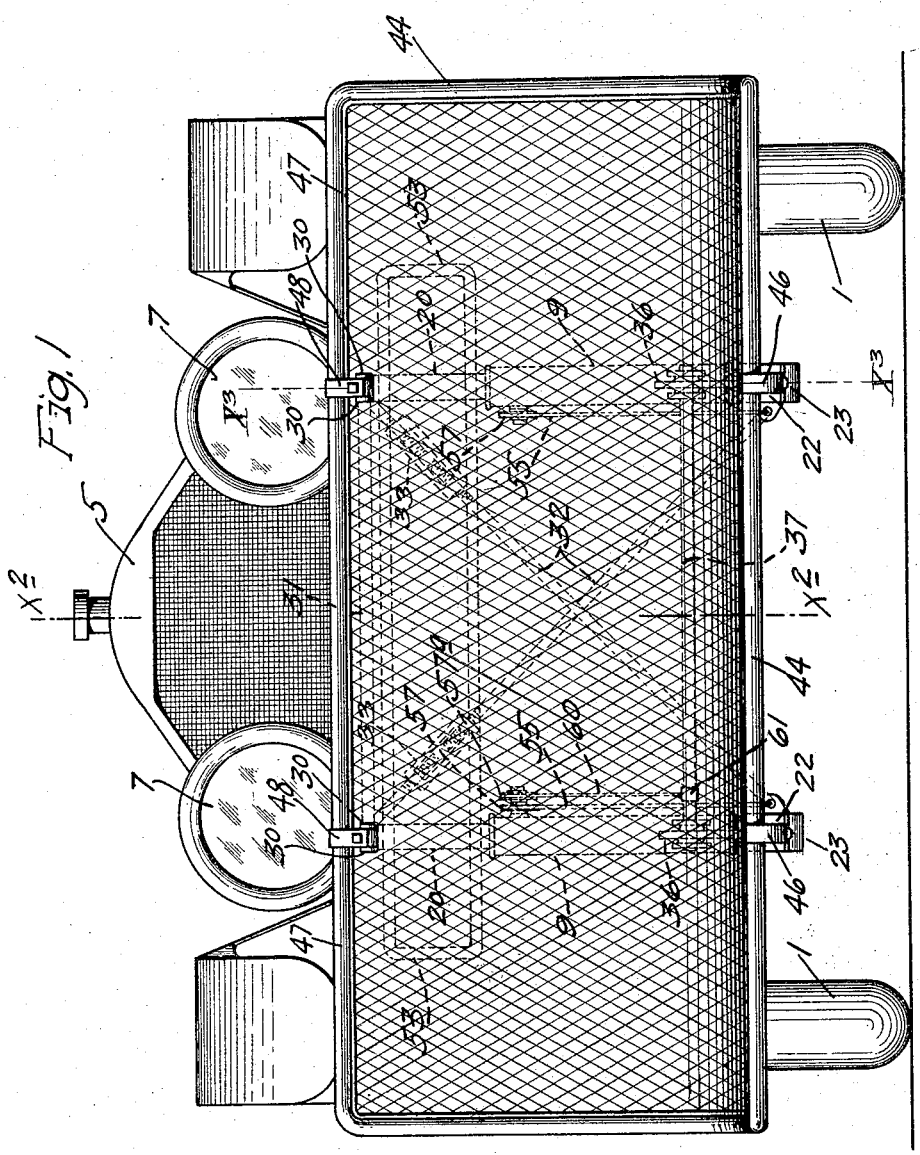
Figure 2:
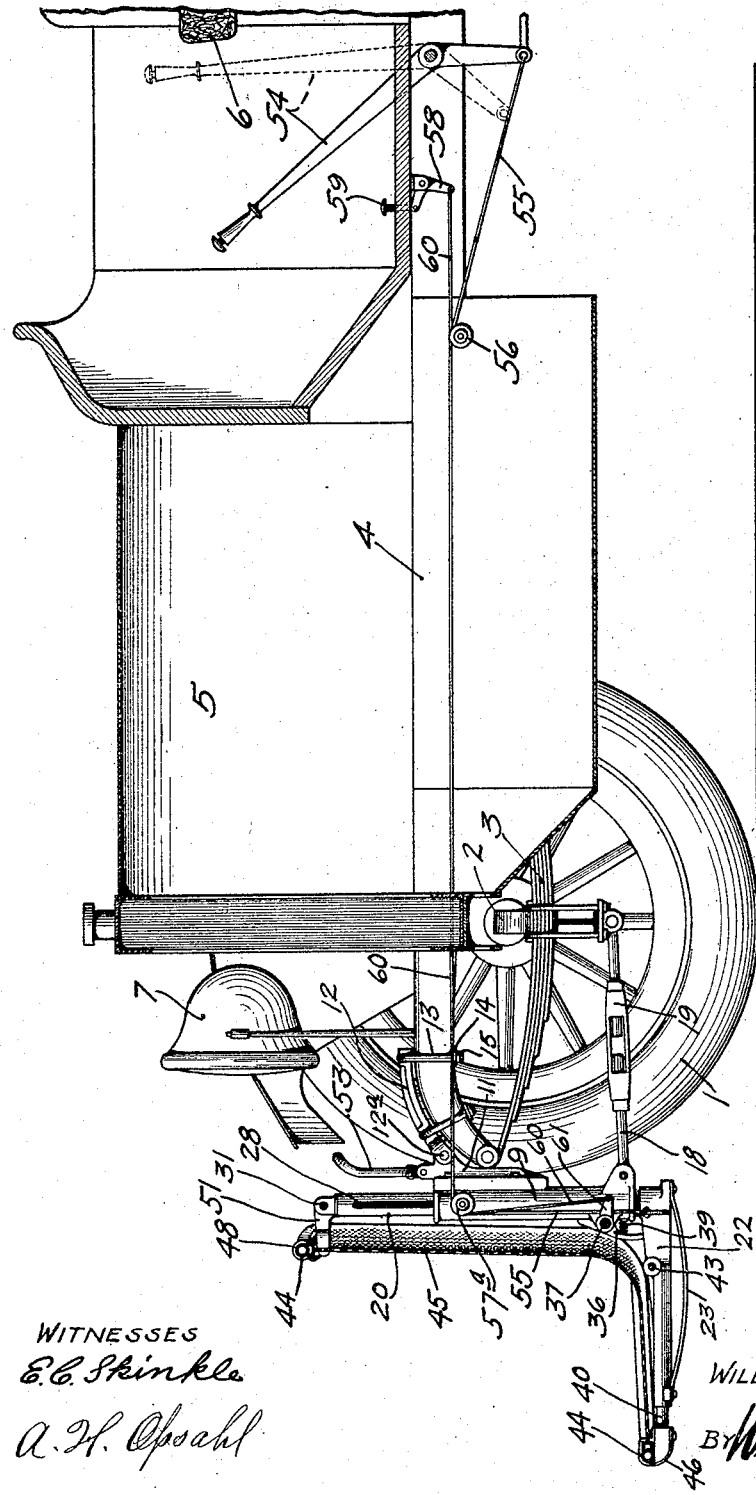

Referring to the drawings: Figure 1 is a front elevation showing the improved fender applied to an automobile; Fig. 2 is a vertical section taken approximately on the line $x^2$ $x^2$ on Fig. 1; Fig. 3 is a vertical section taken approximately on the line $x^3$ $x^3$ on Fig. 1, the raised position of the fender being indicated by full lines and the lowered position thereof by dotted lines. Fig. 4 is a rear elevation showing approximately one-half of the fender with some parts removed; and Fig. 5 is a horizontal section taken on the line $x^5$ $x^5$ on Fig. 4.

Of the parts of the automobile, the numeral 1 indicates the front wheels, the numeral 2 the front axle, the numeral 3 the front springs, and the numeral 4 the frame bars, which latter are pivotally connected to the front ends of the springs 3 in the usual way. The numeral 5 indicates the engine housing, the numeral 6 the driver's seat, the numeral 7 the lamps. All of the parts so far described are or may be assumed to be of well known construction. It may be noted, however, that the frame bars 4 project in front of the front axle, and approximately to the most forward portions of the front wheels, this being a feature, however, which is common in automobile construction.

For the attachment of the fender to the automobile and to support the same with freedom for vertical movements, I employ vertically extended fender guides preferably in the form of long upright sleeves 9. These guide sleeves 9 are connected to the automobile by hanger devices which, in themselves, involve important novel features, and which adapt the fender to be applied in proper position to automobiles, varying considerably in dimensions and design, and to be properly set, both in respect to a vertical and in respect to normal elevation from the ground. To such ends, the sleeves 9 are preferably provided on the rear sides of their upper portions with integrally cast serrated bearing plates 10 that engage with correspondingly serrated faces of hanger brackets 11, which, in turn, at their upper portions, are pivoted to the front ends of anchor bars 12 at $12^a$. The said anchor bars 12 are adjustably and detachably but rigidly clamped to the curved front ends of the frame bars 4, by heavy U-bolts 13, provided with clamping bars 14 and nuts 15 applied, as best shown in Fig. 3. The serrated faces of the above noted members 10 and 11 are rigidly but adjustably clamped together by machine screws 16 passed through vertical slots 17 in the said members 11 and screwed into threaded seats in the said members 10.

At their lower ends, the guide sleeves 9 are provided with rearwardly projecting lugs that are pivotally connected to the front ends of thrust rods 18, the rear ends of which are pivotally attached to the front axle or steering gear 2. These thrust rods 18 are made adjustable by means of turn buckles 19.

The fender proper is carried by vertically movable plungers or bars 20 preferably of tubular form, and which work vertically through the upright guide sleeves 9 and are longer than the said sleeves, so that they project both at their upper and lower ends with freedom for the required vertical movements. Rigidly secured to the lower ends of the plungers 20, as shown, by means of pins 21, are forwardly projecting shoes 22. These shoes 22 are provided with ground-engaging soles or runners 23 formed by curved flat spring bars attached to the bottoms of the said shoes by rivets, or otherwise, so that they adapt the shoes to slide over the ground, pavement, or roadbed without being caught in small holes or crevices.

The tubular plungers 20 are yieldingly pressed downward, both by gravity, and by coiled springs 24, which springs are placed within the respective tubular plungers, with their lower ends re-acting against the shoes, and with their upper ends re-acting against the guide sleeves. As shown, the lower ends of the said springs directly bear against small blocks 25, which, in turn, rest upon the pins 21; and the upper ends of the said springs re-act against blocks 26, which, in turn, are anchored to the upper portions of the guide sleeves 9, by means of pins 27, which pins work through long vertical slots 28 in the sides of the tubular plungers. The numeral 29 indicates cushioning blocks, preferably of rubber placed upon the blocks 26, and are adapted to be thrust against plugs 30 rigidly secured in the upper ends of the said tubular plungers.

The two plungers 20 are tied together for common vertical movements, as shown, by an upper tie rod 31 and obliquely crossed truss rods 32, which latter are made adjustable by turn blocks 33. The tie rod 31 is extended through the pronged heads of the plunger plugs 30, and is provided with clamping nuts 34. The truss rods 32 are provided with perforated upper ends through which the tie rod 31 is passed and which are clamped between the inner nuts 34 and adjacent lugs of the said plugs 30. At their lower ends, the truss rods 32 are anchored to lugs 35 shown as cast integral with the inner faces of the rear end portions of the shoes 22 (see particularly Fig. 4).

The plungers 20 are adapted to be held in raised positions, against the tension of the springs 24, by means of lock dogs 36, secured to the ends of a rock shaft 37 journaled in suitable bearing lugs on the front lower portions of the bearing sleeves 9. These lock dogs work through suitable clearance passages in the sleeves 9 and engage with one or more detents or notches 38 in the front faces of the plungers 20 (see particularly Fig. 3). The lock dogs 36 are provided with depending lower ends that are subject to springs 39 compressed between the same and suitable bearings on the lower ends of the sleeves 9, normally maintaining engagement between the dogs 36 in the said detents 38, and their lower ends are normally held forward.

The forwardly projected lower ends of the dogs 36 stand just at the rear of and are adapted to be engaged by the rear ends of lock tripping bolts 40 that are mounted to slide forwardly and rearwardly in the shoes 22 and are yieldingly pressed forward by coiled springs 41 seated within the said shoes and re-acting against shoulders on the said shoes and tripping bolts. The said springs 41 normally hold the tripping bolts 40 as far forward as permitted by stop collars 42 on the rear ends of the said bolts. Here it may be noted that the shoes 22 are formed with openings that afford clearance for the lower ends of the lock dogs and it may be here also noted that the two laterally spaced shoes are further tied together by a cross rod 43 best shown in Figs. 3 and 4.

The fender proper, or in other words, the primary element of the fender is made up of a marginal frame 44 and a filler which is preferably a wire netting 45. The marginal frame 44 is preferably constructed from a wrought iron or steel pipe or tubing and is so bent that when viewed from the front, it has a transversely elongated approximately rectangular form, and when viewed from the side, or edgewise, it has an approximately L-shape with its lower transverse bar projecting forward of the upright portions thereof and of the netting. Here it is important to note that this transversely extended lower bar of the said marginal frame is connected to the forwardly projected ends of the tripping bolts 40, so that it is utilized as a buffer and tripping bar for releasing the fender carrying plungers automatically, whenever the said bar strikes an object or obstruction with sufficient force to overcome the tension of the springs 41 and 39. The lower front horizontal bar of the said fender frame 44 is shown as pivotally connected to the front ends of the tripping plungers 40, by means of straps 46 that embrace the same and are bolted, or otherwise secured to the front ends of the said bolts 40. Here it may be also noted that the front ends of the tripping bolts 40 and the lower portions of the straps 46 are curved forwardly and upwardly so that they afford what may be termed "cam-shaped toes" to the shoes 22.

Preferably, the netting 45, instead of being directly secured to the tubular frame 44, is directly secured to a light channel iron marginal subframe 47, which, in turn, is bolted, or otherwise secured to the said tubular frame 44. The upper bars of the said frame 40 and subframe 47 are shown as rigidly clamped together, and to knuckle blocks 49, by means of yokes 48 and small bolt-equipped nuts 50. These so-called knuckle blocks 49 are pivotally connected to the bifurcated front ends of short links or arms 51, which arms, at their rear ends, are pivotally connected to the bifurcated upper ends of the plunger plugs 30, by means of the above noted tie rod 31. The arms 50 are provided with rest lugs 52 (see Fig. 3), which rest upon the plugs 30 and limit the downward movements of the said levers, and hence, the downward movements of the upper portion of the fender proper.

The numeral 53 indicates a supplemental fender or guard that is secured to and supported by the upper portions of the hanger brackets 11. This supplemental fender or guard prevents a person or object from being knocked over the top of the main fender, when the said fender is dropped into the dotted line position shown in Fig. 3. This supplemental fender 53 should be pivotally connected to the said brackets 11 so that it may be turned forward and downward, and hence, out of the way when an engine is to be cranked from the fender.

The numeral 54 indicates a lever suitably pivoted to the machine understructure and extended upward through the platform to a point within easy reach of the operator's seat 6. This lever is utilized to restore the fender to raised position after it has been tripped, and for such purpose, the lower end thereof is attached to the rear ends of the lifting cables 55, which cables, as shown, are passed over guide wheels 56 on the machine underframe structure and over guide wheels 57 journaled on projected ends of the pins 27 already described. Here it may be noted that a similar guide sheave or wheel 57ª is also journaled on the projecting end of one of the pins 27 (see Fig. 5). The front ends of the lifting cables 55 are attached to lugs 35 of the shoes 22 (see Fig. 4).

The numeral 58 indicates a small bell crank pivoted to the machine underframe structure and provided with a foot operated extension 59 located above the flooring and within reach of the foot of the operator on the seat 6. The lower arm of the bell crank 58 is connected to the rear ends of a cable 60 that is brought forward and passed over the guide sheave 57ª, and thence downward and attached to an arm 61 on the rock shaft 37, to which latter, it will be remembered, the two lock dogs 36 are rigidly secured. Obviously, when the foot piece 59 is stepped upon, both lock dogs 36 will be simultaneously released, and the spring 24 will then quickly throw the fender down into the dotted line operative position shown in Fig. 3.

The automatic tripping action of the fender is probably obvious, but may be briefly stated as follows: Whenever an object or obstruction strikes the lower front bar of the fender frame 44, the said frame will be forced rearward, carrying the tripping bolts 40 with it, and the rear ends of the said tripping bolts, being thus forced against the depending ends of the lock dogs 36, will cause the said dogs to release the plungers 20 and permit the springs 24 to quickly throw the fender downward into its operative position. This tripping action will take place even when one side of the fender is thrown back farther than the other by the striking of one side of the fender bar against the obstruction or object, for the reason that the two dogs are connected to a common rock shaft, so that a releasing movement directly applied to one will cause the simultaneous release of the other.

When the fender frame is moved rearward, its lower bar moves horizontaly or in a plane parallel to the axle of the tripping bolts 40, and this will cause the top bar of the said fender frame to rise. This rising movement of the top bar of the fender frame is freely permitted by oscillatory movements of the levers 51.

In applying the fender to an automobile, the anchor bars 12 are secured to the front ends of the frame bars 4 by means of the U-bolts 13, clamping bars 14 and nuts 15. The different curvature and projection of the frame bars of different machines will cause the anchor bars 12 to be applied to different machines in different positions in respect to the inclination and forward projection. The fender may be set at the proper normal altitude by the adjustment permitted between the anchor brackets 11 and the plunger guide sleeves 9. The plunger guiding sleeves may then be properly set in vertical positions by adjustments of the thrust rods or bars 18. Also, these thrust rods take the impact strains produced in the fender when the fender strikes an obstacle or obstruction, such as a person caught in the netting of the fender, and thus the hanger brackets of the fender are relieved from these strains. These several adjustments, as already indicated, permit the fender to be properly applied to the various different makes of automobiles which have forwardly projecting frame bars.

The spring or resilient shoe soles or runners on the bottoms of the shoes cushion the jar which would otherwise be produced when the fender is tripped and thrust downward by the springs 24, and also afford the best kind of a runner or slipping surface for the shoes. The tripping bolts 40 and their springs 41 are so incased within the shoes that they are protected from dirt and mud. The entire construction is simple, strong and durable and not liable to get out of order.

The term "running gear" is herein used to designate what is frequently designated as the chassis of an automobile or similar vehicle.

What I claim is:

1. A fender comprising plunger guides, vertically movable plungers working in said guides, a fender frame provided with a filler, means connecting the lower portion of said fender frame to the lower portions of said plungers with freedom for forward and rearward movements, and links connecting the upper portions of said plungers to the upper portion of said fender frame.

2. The combination with plunger guides, of vertical plungers working through said guides and provided at their lower ends with forwardly projecting shoes, forwardly projecting bolts movable in said shoes, a fender frame provided with a filler and having an upright rear portion and forwardly projecting bottom portion, the latter being connected to the front ends of said bolts, and links pivotally connected to the upper ends of said plungers and to the upper portion of said fender frame.

3. The combination with plunger guides, of vertical plungers working through said guides and provided at their lower ends with forwardly projecting shoes, forwardly projecting bolts movable in said shoes, a fender frame provided with a filler and having an upright rear portion and forwardly projecting bottom portion, the latter being connected to the front ends of said bolts, links pivotally connected to the upper ends of said plungers and to the upper portion of said fender frame, the said links having limited downward movements against said plungers, and springs applied to said bolts and yieldingly pressing the same forward.

4. The combination with plunger guides, of vertical plungers working through said guides and provided at their lower ends with forwardly projecting shoes, forwardly projecting bolts movable in said shoes, a fender frame provided with a filler and having an upright rear portion and forwardly projecting bottom portion, the latter being connected to the front ends of said bolts, links pivotally connected to the upper ends of said plungers and to the upper portion of said fender frame, the said links having limited downward movements against said plungers, springs applied to said bolts and yieldingly pressing the same forward, and lock dogs normally holding said plungers and fender raised, said dogs having projections arranged to be engaged by the rear ends of said bolts to trip said dogs.

5. The combination with plunger guides, of plungers movable vertically therethrough and provided at their lower ends with forwardly projecting shoes, dogs pivoted to said plunger supports and normally operative on said plungers to hold the same raised, said dogs having depending trip arms and said shoes having recesses in which they work freely, forwardly spring-pressed tripping bolts mounted in said shoes and incased thereby with their rear ends in position to engage the depending arms of said lock dogs, and a fender supported by the front ends of said tripping bolts and the upper portions of said plungers.

6. A fender for automobiles comprising upright plunger guides, anchor bars pivotally connected to said plunger guides and provided with means for attachment to an automobile frame, longitudinally extensible thrust rods connected to the lower portions of said plunger guides and adapted to be connected at their rear ends to an automobile running gear, and a fender having plungers movable vertically in said plunger guides.

7. A fender for automobiles comprising upright plunger guides, serrated bearing plates, anchor brackets having serrated faces connected to the serrated faces of said bearing plates with freedom for vertical adjustments, anchor bars pivotally connected to said brackets and adapted to be secured to the frame of an automobile, longitudinally extensible thrust rods connected to the lower ends of said plunger guides and adapted to be anchored to the running gear of the automobile, and a fender having plungers working vertically in said plunger guides.

8. A fender for automobiles comprising upright plunger guides, serrated bearing plates, anchor brackets having serrated faces connected to the serrated faces of said bearing plates with freedom for vertical adjustments, anchor bars pivotally connected to said brackets and adapted to be secured to the frame of an automobile, longitudinally extensible thrust rods connected to the lower ends of said plunger guides and adapted to be anchored to the running gear of the automobile, a fender having plungers working vertically in said plunger guides, and a supplemental fender applied to said hanger brackets.

9. The combination with an automobile having frame bars terminating in curved front ends, of anchor bars adjustably secured thereto, hanger brackets pivotally connected to said anchor bars, plunger guides connected to said hanger brackets for vertical adjustment, adjustable thrust rods connecting the lower ends of said plunger guides to the running gear of said automobile, and a fender having plungers movable vertically in said plunger guides.

10. A fender for automobiles comprising plunger guides, plungers movable vertically in said guides and provided with forwardly projecting shoes, spring soles or runners applied to the bottoms of said shoes, a fender carried by said plungers and their shoes, springs yieldingly pressing said plungers downward, and lock dogs normally holding said plungers, shoes and fender in elevated position.

In testimony whereof I affix my signature in presence of two witnesses.

WILLIAM A. LINQUIST.

Witnesses:
HARRY D. KILGORE,
F. D. MERCHANT.

Copies of this patent may be obtained for five cents each, by addressing the "Commissioner of Patents, Washington, D. C."